(12) United States Patent
Friedman et al.

(10) Patent No.: US 12,218,852 B2
(45) Date of Patent: Feb. 4, 2025

(54) OUT-OF-ORDER PACKET PROCESSING

(71) Applicant: MELLANOX TECHNOLOGIES, LTD., Yokneam (IL)

(72) Inventors: Yamin Friedman, Haifa (IL); Daniel Marcovitch, Yokneam Illit (IL); Gil Levy, Hod Hasharon (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/524,010

(22) Filed: Nov. 30, 2023

(65) Prior Publication Data

US 2024/0098034 A1  Mar. 21, 2024

Related U.S. Application Data (60) Division of application No. 17/987,911, filed on Nov. 16, 2022, now Pat. No. 11,909,660, which is a continuation of application No. 17/153,914, filed on Jan. 21, 2021, now Pat. No. 11,533,267.

(51) Int. Cl.
*H04L 47/34* (2022.01)
*H04L 1/18* (2023.01)

(52) U.S. Cl.
CPC ............. *H04L 47/34* (2013.01); *H04L 1/18* (2013.01)

(58) Field of Classification Search
CPC ........................................................ H04L 47/34
See application file for complete search history.

(56) References Cited

U.S. PATENT DOCUMENTS

| | | | |
|---|---|---|---|
| 5,648,970 A | 7/1997 | Kapoor | |
| 6,381,215 B1 | 4/2002 | Hamilton et al. | |
| 7,349,400 B2 | 3/2008 | Khirman | |
| 7,760,741 B2 | 7/2010 | Biran et al. | |
| 8,213,315 B2 | 7/2012 | Crupnicoff et al. | |
| 8,576,715 B2 | 11/2013 | Bloch et al. | |
| 10,264,003 B1 | 4/2019 | Wu et al. | |
| 10,334,582 B2 | 6/2019 | Yi et al. | |
| 11,533,267 B2 | 12/2022 | Friedman et al. | |
| 11,909,660 B2 | 2/2024 | Friedman et al. | |
| 2003/0026248 A1 | 2/2003 | Hiroki | |
| 2003/0227875 A1 | 12/2003 | Wei et al. | |
| 2004/0042458 A1 | 3/2004 | Elzu | |
| 2006/0013257 A1 | 1/2006 | Vayanos | |
| 2010/0008278 A1 | 1/2010 | Kone et al. | |

(Continued)

FOREIGN PATENT DOCUMENTS

EP   1382150 B1   2/2007

OTHER PUBLICATIONS

Infiniband Trade Association, "InfiniBandTM Architecture Specification", vol. 1, Release 1.3, pp. 1-1842, Mar. 3, 2015.

*Primary Examiner* — Benjamin Lamont (74) *Attorney, Agent, or Firm* — Meitar Patents Ltd.; Daniel Kligler (57) ABSTRACT

In one embodiment, a communication apparatus, including a network interface configured to receive over a network a sequence of data packets of a network flow having a defined packet order, wherein the network interface is configured to receive an out-of-order data packet instead of multiple missing data packets according to the defined packet order, a timer, and packet processing circuitry configured to activate the timer responsively to receiving the out-of-order data packet, and set the time period over which the timer is activated responsively to a quantity of the multiple missing data packets.

13 Claims, 8 Drawing Sheets

(56) References Cited

U.S. PATENT DOCUMENTS

| | | |
|---|---|---|
| 2011/0090795 A1 | 4/2011 | Li et al. |
| 2011/0153834 A1 | 6/2011 | Bharrat |
| 2011/0170548 A1 | 7/2011 | Kang |
| 2012/0047407 A1 | 2/2012 | Tilwani et al. |
| 2012/0089892 A1 | 4/2012 | Kang |
| 2013/0019025 A1 | 1/2013 | Chaturvedi et al. |
| 2014/0160952 A1 | 6/2014 | Astigarraga et al. |
| 2014/0304394 A1 | 10/2014 | A |
| 2015/0055482 A1 | 2/2015 | Larson et al. |
| 2016/0234127 A1 | 8/2016 | Agarwal et al. |
| 2016/0380869 A1 | 12/2016 | Shen et al. |
| 2018/0049272 A1 | 2/2018 | Bagheri et al. |
| 2019/0132085 A1 | 5/2019 | Shpiner et al. |
| 2020/0068652 A1 | 2/2020 | Xu et al. |
| 2020/0396768 A1 | 12/2020 | Abouelseoud et al. |
| 2021/0007137 A1 | 1/2021 | Abouelseoud et al. |
| 2021/0058945 A1 | 2/2021 | Zhang et al. |
| 2021/0345177 A1 | 11/2021 | Kanamarlapudi et al. |
| 2022/0085916 A1 | 3/2022 | Debbage et al. |
| 2022/0131944 A1 | 4/2022 | Yao et al. |
| 2023/0189394 A1 | 6/2023 | Deshmukh et al. |

OUT-OF-ORDER PACKET PROCESSING

RELATED APPLICATION INFORMATION

The present application is a Divisional of U.S. patent application Ser. No. 17/987,911 filed 16 Nov. 2022, which is a Continuation of U.S. patent application Ser. No. 17/153,914 filed 21 Jan. 2021, the disclosures of which are hereby incorporated herein by reference.

FIELD OF THE INVENTION

The present invention relates to computer networks, and in particular, but not exclusively to, packet processing.

BACKGROUND

In computer networking, data packets are frequently delivered to their destination out of order, i.e., in a different order from that in which they were sent. Out-of-order delivery is most commonly caused by packets following multiple different paths through a network with different transmission latencies.

Out-of-order delivery is a common phenomenon in Internet Protocol (IP) networks. In the well-known Transmission Control Protocol (TCP), TCP frames are divided into multiple segments, which are encapsulated in corresponding IP data packets. Each segment carries a sequence number in the TCP header, and the length of the data payload in the segment can be derived from the length field in the IP header of the packet. Thus, even when the IP packets carrying the segments of a TCP frame arrive at their destination out of order, the receiver is able to reorder the packets and write the payloads to its local memory in the proper sequence.

To relieve the host processor of the burden of TCP processing in software, some network interface controllers (NICs) offer TCP offload capabilities. NICs of this sort are capable of both processing the TCP headers and of writing and reading data directly to and from the host memory. For example, U.S. Pat. No. 7,760,741 describes a network acceleration architecture for use with TCP. The architecture includes a hardware acceleration engine adapted for communication with and processing data from a consumer application, a software protocol processor adapted for carrying out TCP implementation, and an asynchronous dual-queue interface for exchanging information between the hardware acceleration engine and the software protocol processor. A virtually-contiguous reassembly buffer is used to handle out-of-order segments.

InfiniBand™ (IB) is a switched-fabric communications architecture that is widely used in high-performance computing. Computing devices (host processors and peripherals) connect to the IB fabric via a NIC that is referred to in IB parlance as a channel adapter. Host processors (or hosts) use a host channel adapter (HCA), while peripheral devices use a target channel adapter (TCA). The IB architecture defines both a layered hardware protocol (Physical, Link, Network, Transport Layers) and a software layer, which manages initialization and communication between devices.

Processes executing on nodes of an IB network communicate with one another using a queue-based model. Sending and receiving processes establish a queue pair (QP), which consists of a send queue (SQ) and a receive queue (RQ). Send and receive work requests (WR) by a process running on a host cause corresponding commands, known as work queue elements (WQEs), to be loaded into these queues for processing by the HCA. The WQE causes the HCA to execute a transaction, in which a message containing data is transmitted over the network. The message data may be spread over the payloads of multiple, successive packets. The transaction may comprise, for example, a remote direct memory access (RDMA) read or write transaction or a SEND transaction. To receive a SEND message on a given QP, a receive WQE indicating the receive buffer address is posted to that QP. Upon completion of a WQE, the HCA posts a completion queue element (CQE) to a completion queue, to be read by the initiating process as an indication that the WR has been fulfilled.

Each QP is treated by the IB transport layer as a unique transport service instance. The transport layer is responsible for in-order packet delivery, partitioning, channel multiplexing and transport services. The transport layer also handles transaction data segmentation when sending and reassembly when receiving. Based on the Maximum Transfer Unit (MTU) of the path, the transport layer divides the data into packets of the proper size. A receiver reassembles the packets based on the Base Transport Header (BTH), which contains the destination queue pair and packet sequence number (PSN). The receiving HCA acknowledges the packets, and the sending HCA receives these acknowledgements and updates the completion queue with the status of the operation.

InfiniBand specifies a number of different transport services, including Reliable Connection (RC), Unreliable Connection (UC), Reliable Datagram (RD), and Unreliable Datagram (UD). RC provides a reliable transfer of data between two entities, which supports RDMA operations and SEND operations, as well as atomic operations, with reliable channel semantics. As a connection-oriented transport RC requires a dedicated queue pair (QP) for each pair of requester and responder processes. Alternatives to the original RC model include the Extended Reliable Connected (XRC) transport service, in which a single receive QP to be shared by multiple shared receive queues (SRQs) across one or more processes running on a given host; and reliable connections provided by the Dynamically-Connected (DC) transport service, as described, for example, in U.S. Pat. No. 8,213,315.

SUMMARY

There is provided in accordance with an embodiment of the present disclosure, a communication apparatus, including a network interface configured to receive over a network a sequence of data packets of a network flow having a defined packet order, wherein the network interface is configured to receive an out-of-order data packet, a timer, and packet processing circuitry configured to activate the timer responsively to receiving the out-of-order data packet.

Further in accordance with an embodiment of the present disclosure the packet processing circuitry is configured to check for receipt of a missing data packet while the timer is activated, and upon expiration of a time period over which the timer is activated without having received the missing data packet, to perform a given operation.

Still further in accordance with an embodiment of the present disclosure the packet processing circuitry is configured upon expiration of the time period over which the timer is activated without having received the missing data packet to request retransmission of the missing data packet from a sending node.

Additionally, in accordance with an embodiment of the present disclosure the packet processing circuitry is configured to not request retransmission of the missing data packet prior to the expiration of the time period.

Moreover, in accordance with an embodiment of the present disclosure the network interface is configured to receive the out-of-order data packet instead of an expected, but missing, one of the data packets the defined packet order.

Further in accordance with an embodiment of the present disclosure the packet processing circuitry is configured to deactivate the timer responsively to receiving the missing data packet.

Still further in accordance with an embodiment of the present disclosure the timer is flow-specific, the network interface is configured to receive over the network another sequence of data packets of another network flow having a defined packet order, and the packet processing circuitry is configured to activate another timer responsively to receiving an out-of-order data packet instead of an expected, but missing data packet of the other network flow.

Additionally in accordance with an embodiment of the present disclosure the network interface is configured to receive at least one out-of-order data packet instead of multiple missing data packets the defined packet order, the packet processing circuitry is configured to activate the timer responsively to receiving the at least one out-of-order data packet instead of the multiple missing data packets, check for receipt of the multiple missing data packets while the timer is activated, and upon expiration of a time period over which the timer is activated without having received all of the multiple missing data packets, request retransmission of at least one of the multiple missing data packets not yet received.

Moreover, in accordance with an embodiment of the present disclosure the packet processing circuitry is configured to deactivate the timer responsively to receiving all of the multiple missing data packets.

Further in accordance with an embodiment of the present disclosure the packet processing circuitry is configured to not request retransmission of any of the multiple missing data packets prior to the expiration of the time period.

Still further in accordance with an embodiment of the present disclosure the packet processing circuitry is configured to extend the time period over which the timer is activated.

Additionally, in accordance with an embodiment of the present disclosure, the apparatus includes a controller configured to collect statistics of a quantity of packet retransmission requests made by the packet processing circuitry and a quantity of duplicate packets received by the packet processing circuitry.

Moreover, in accordance with an embodiment of the present disclosure the controller is configured to adjust a time period over which the timer is activated responsively to the quantity of packet retransmission requests and the quantity of duplicate packets received.

Further in accordance with an embodiment of the present disclosure the controller is configured to reduce a time period over which the timer is activated responsively to a ratio of the quantity of packet retransmission requests to the quantity of duplicate packets received exceeding a given limit, and increase the time period over which the timer is activated responsively to a ratio of the quantity of packet retransmission requests to the quantity of duplicate packets received being less than a given limit.

Still further in accordance with an embodiment of the present disclosure the out-of-order data packet is flagged as being rerouted by a switch in the network, and the packet processing circuitry is configured to set a time period over which the timer is activated responsively to the out-of-order data packet being flagged as being rerouted to a time value which is different than if the out-of-order packet was not flagged as being rerouted.

There is also provided in accordance with another embodiment of the present disclosure, a communication method, including receiving over a network a sequence of data packets of a network flow having a defined packet order, receiving an out-of-order data packet, and activating a timer responsively to receiving the out-of-order data packet.

Additionally, in accordance with an embodiment of the present disclosure, the method includes checking for receipt of a missing data packet while the timer is activated, and upon expiration of a time period over which the timer is activated without having received the missing data packet, performing a given operation.

Moreover, in accordance with an embodiment of the present disclosure the performing the given operation includes requesting retransmission of the missing data packet from a sending node.

Further in accordance with an embodiment of the present disclosure, the method includes not requesting retransmission of the missing data packet prior to the expiration of the time period.

Still further in accordance with an embodiment of the present disclosure the receiving the sequence of the data packets includes receiving the out-of-order data packet instead of an expected, but missing, one of the data packets the defined packet order.

Additionally, in accordance with an embodiment of the present disclosure, the method includes deactivating the timer responsively to receiving the missing data packet.

Moreover, in accordance with an embodiment of the present disclosure the timer is flow-specific, the method further includes receiving over the network another sequence of data packets of another network flow having a defined packet order, and activating another timer responsively to receiving an out-of-order data packet instead of an expected, but missing data packet of the other network flow.

Further in accordance with an embodiment of the present disclosure, the method includes receiving at least one out-of-order data packet instead of multiple missing data packets the defined packet order, activating the timer responsively to receiving the at least one out-of-order data packet instead of the multiple missing data packets, checking for receipt of the multiple missing data packets while the timer is activated, and upon expiration of a time period over which the timer is activated without having received all of the multiple missing data packets, requesting retransmission of at least one of the multiple missing data packets not yet received.

Still further in accordance with an embodiment of the present disclosure, the method includes deactivating the timer responsively to receiving all of the multiple missing data packets.

Additionally, in accordance with an embodiment of the present disclosure, the method includes not requesting retransmission of any of the multiple missing data packets prior to the expiration of the time period.

Moreover, in accordance with an embodiment of the present disclosure, the method includes extending the time period over which the timer is activated.

Further in accordance with an embodiment of the present disclosure, the method includes collecting statistics of a quantity of packet retransmission requests and a quantity of duplicate packets received.

Still further in accordance with an embodiment of the present disclosure, the method includes adjusting a time period over which the timer is activated responsively to the quantity of packet retransmission requests and the quantity of duplicate packets received.

Additionally, in accordance with an embodiment of the present disclosure, the method includes reducing a time period over which the timer is activated responsively to a ratio of the quantity of packet retransmission requests to the quantity of duplicate packets received exceeding a given limit, and increasing the time period over which the timer is activated responsively to a ratio of the quantity of packet retransmission requests to the quantity of duplicate packets received being less than a given limit.

Moreover, in accordance with an embodiment of the present disclosure the out-of-order data packet is flagged as being rerouted by a switch in the network, the method further including setting a time period over which the timer is activated responsively to the out-of-order data packet being flagged as being rerouted to a time value which is different than if the out-of-order packet was not flagged as being rerouted.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, there are situations where although data packets are transmitted by a computer host according to a given packet order, the data packets are not received by the recipient in that order. For example, when the data packets traverse a network via different routes, some of the routes may be quicker, thereby resulting in data packets arriving at the recipient out-of-order. For example, if an out-of-order data packet is received, instead of an expected, now missing, data packet, receiving the out-of-order data packet may be indicative of the missing data packet being late or lost (e.g., dropped by an intervening switch or router).

One solution to the above problem is to ignore the missing packet and allow the sender of the packet to retransmit the missing packet to the recipient automatically after a given timeout of not receiving an acknowledgment from the recipient. However, this solution may create a long delay in processing received packets in some situations.

Another solution is for the recipient to automatically request retransmission of the missing packet as soon as the recipient detects the missing packet, e.g., on receipt of the out-of-order data packet. However, this solution leads to wasted resources for both the sender and recipient if the missing packet arrives before the retransmitted packet.

Therefore, embodiments of the present invention solve the above problems by activating a timer in a host computer responsively to receiving an out-of-order data packet instead of an expected, but missing, data packet or packets according to a defined packet order for this network flow. Retransmission of the missing data packet(s) is not requested until expiration of the timer without the missing data packet(s) being received. For example, if the timer expires prior to receiving the missing data packet(s), the host computer requests retransmission of the missing data packet(s) yet to be received. However, if the missing data packet (or all the missing data packets where there are multiple missing data packets) arrive prior to expiration of the timer, the timer is deactivated.

The time period over which the timer is activated is shorter than the timeout used by the sending host computer to automatically resend data packets for which an acknowledgment was not received from the recipient host computer.

The timer is generally flow-specific in that a different, or separate, timer is activated for missing data packets of each network flow. A "network flow" is typically identified by the values of a specified set of header fields, such as the IP and TCP/UDP 5-tuple of source and destination addresses, source and destination ports, and protocol, or any suitable flow information such as layer 2, 3, 4 or tunnel data, which are consistent over all of the packets in the flow.

In some embodiments, once a timer has been activated for a respective network flow, if an additional missing data packet (or packets) from the same network flow is detected, the additional missing data packet(s) is also tracked using the same timer. For example, if a timer is activated for a missing data packet or packets and while the timer is still running one or more additional data packets of the same network flow are detected responsively to receiving another out-of-order data packet, if the timer expires prior to receiving all of the missing data packets (including the additional data packet(s)), the host computer requests all of the missing data packets not yet received, but if all the missing data packets are received prior to the timer expiring, the timer is deactivated.

In some embodiments, the timer is dynamic such that the time period over which the timer is run is extended responsively to detecting multiple missing packets responsively to receiving an out-of-order data packet and/or responsively to receiving a missing data packet while one or more missing data packets are still missing. By way of example, the time period over which the timer is run may be set responsively to the quantity of missing data packets detected for a network flow. By way of another example, the time period over which the timer is already being run for missing data packets may be extended responsively to receiving a missing packet while one or more missing data packets are still missing.

In some embodiments, the host computer collects statistics of the quantity of packet retransmission requests made by the host computer and a quantity of duplicate packets received by the host computer. The statistics provide a measure of whether the time period of which the timer is activated is too long or too short. In some embodiments, the host computer adjusts the time period of which the timer is activated responsively to the collected statistics. For example, if the ratio of the quantity of packet retransmission requests to the quantity of duplicate packets exceeds a given limit, the time period over time period over which the timer is activated is reduced, and if the ratio of the quantity of packet retransmission requests to the quantity of duplicate packets is less than a given limit, the time period over time period over which the timer is activated is increased. The time period may be adjusted iteratively over time according to newly collected statistics.

As mentioned previously, missing packets are likely missing due to being sent on a different route over the network than the received out-of-order packet. For example, a switch may determine that an existing route over the network is too slow and therefore subsequent packets should be sent along a new route over the network. In such a case, the first packet or packets sent along the new route may arrive at the recipient host computer prior to a packet or packets sent along the existing route. Therefore, in some embodiments, a switch in the network is configured to flag the first data packet sent along the new route so that when that data packet arrives in the host computer ahead of a missing packet or packets, the host computer knows that in all likelihood the missing packet(s) is late due to a delay in the existing route. Therefore, responsively to receiving the out-of-order packet flagged as being rerouted, the host computer sets the time period over which the timer is activated to a time value which is different (e.g., longer) than if the out-of-order packet was not flagged as being rerouted.

System Description

Figure 1:
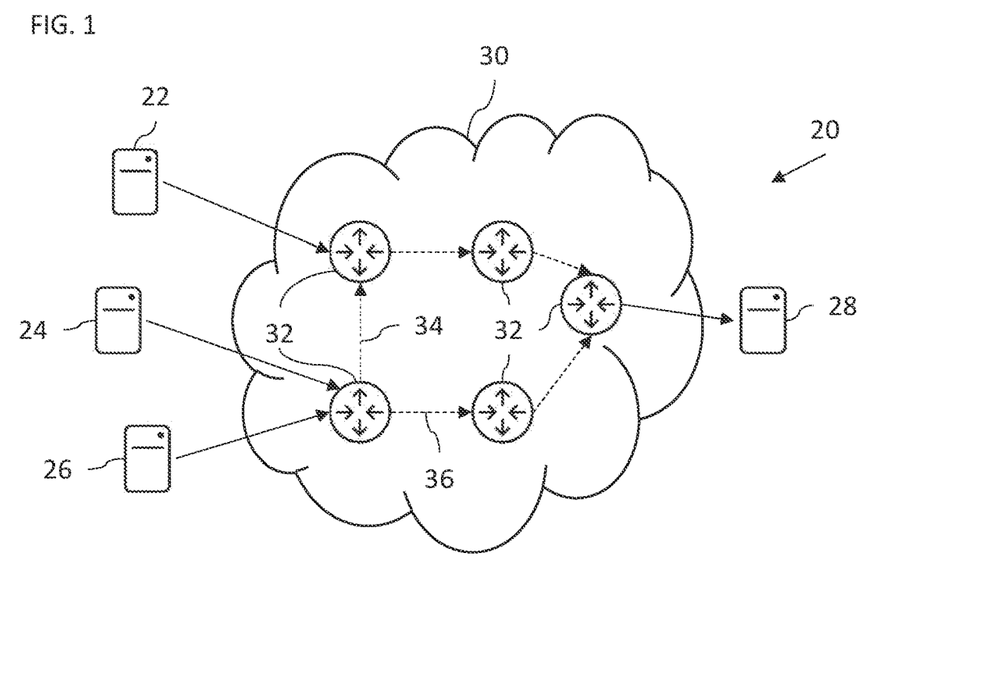
FIG. 1 is block diagram that schematically illustrates a computer system, in accordance with an embodiment of the present invention.

FIG. 1 is block diagram that schematically illustrates a computer system 20 20, in accordance with an embodiment of the present invention. System 20 comprises multiple host computers 22, 24, 26, 28, . . . , which communicate with one another over a network 30 and thus function as nodes of the network 30. In the examples described here, network 30 comprises an IB switch fabric; but the principles of the present invention may similarly be applied in packet networks of other sorts, such as Internet Protocol (IP) networks, that are configured for transport-layer transaction support.

Network 30 may comprise multiple subnets, which are interconnected by routers 32. In some embodiments, one or more of the routers 32 may be replaced by switches. At least some of host computers 22, 24, 26 and 28 may be located in different subnets, which may be connected by different routing paths. Adaptive routing techniques, such as the techniques described in U.S. Pat. No. 8,576,715, may be used in choosing the optimal routing path and changing the path as required. As a result, for example, sending computer 26 may initially transmit packets to receiving computer 28 via a path 34. Subsequently, routers 32 may choose a different path from computer 26 to computer 28, such as a path 36, possibly due to occurrence of congestion on path 34. As a result of this routing change, one or more packets conveyed over path 36 may reach computer 28 before another packet or packets that were transmitted previously over path 34. Computers 22, 24, 26, . . . , may encounter similar problems in packet streams that they receive. These problems are addressed by the embodiments described herein.

Figure 2:
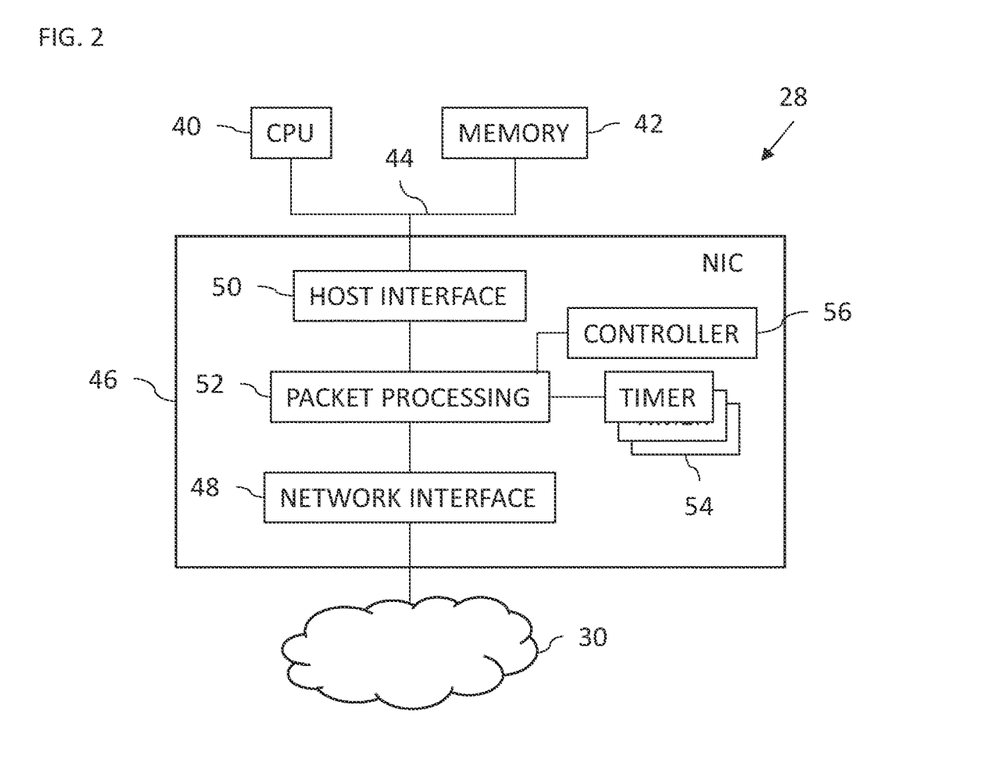
FIG. 2 is a block diagram that schematically illustrates components of a host computer, in accordance with an embodiment of the present invention.

FIG. 2 is a block diagram that schematically illustrates components of host computer 28, in accordance with an embodiment of the present invention. Computer 28 comprises a central processing unit (CPU) 40 and host memory 42, which are connected to a bus 44, such as a PCI Express® bus. The computer is linked to network 30 by a network interface controller (NIC) 46 (which is an example of a communication apparatus), such as an IB HCA. NIC 46 is coupled to bus 44 by a host interface 50, which is capable of reading data from and writing data to memory 42, for example, by direct memory access (DMA), as well as receiving certain instructions from and issuing interrupts to CPU 40. A network interface 48 in NIC 46 comprises one or more ports (not shown) for transmitting packets to and receiving packets from network 30.

Packet processing circuitry 52 is coupled between host interface 50 and network interface 48. As in HCAs that are known in the art, in some embodiments the packet processing circuitry 52 may be configured to read (via the host interface 50) WQEs that are posted to send and receive queues in memory 42 by processes running on CPU 40, and performs transactions accordingly. These transactions may include, for example, composing and transmitting data packets (via network interface 48) to network 30 in response to WQEs in the send queue, as well as writing data from incoming packets to memory 42 in response to WQEs in the receive queue. Upon receipt of data packets from network 30, circuitry 52 writes data from the data packets in the succession to respective locations in host memory 42, for example, by DMA. Incoming RDMA write packets, for example, will contain an indication of the destination addresses in memory 42 to which the data should be written, while for incoming SEND packets, the destination addresses will be indicated by the receive WQE. Incoming RDMA read response packets, which are received in response to an RDMA read request issued to another node by NIC 46, are written by circuitry 52 to addresses in memory 42 indicated by the WQE in the send queue that invoked the transaction.

The NIC 46 also includes timers 54, which may be implemented in software and/or hardware. To handle out-of-order packet arrival, packet processing circuitry 52 activates one of the timers 54 for each network flow with missing packets, with each activated timer 54 being flow-specific, as described in more detail with reference to FIGS. 3-10. The term "flow-specific", as used in the specification and claims, does not necessarily mean that each timer 54 is always assigned to a given flow, but generally means that any timer 54 may be assigned to any flow and then activated, and once activated, the activated timer 54 is used to time packets of the network flow for which that timer 54 was activated.

In practice, some or all of the functions of the packet processing circuitry 52 may be combined in a single physical component or, alternatively, implemented using multiple physical components. These physical components may comprise hard-wired or programmable devices, or a combination of the two. In some embodiments, at least some of the functions of the packet processing circuitry 52 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The NIC 46 may also include a controller 56 described in more detail with reference to FIG. 10.

Reference is now made to FIGS. 3-7, which are schematic views illustrating operation of a missing packet(s) timer for use in the host computer 28 of FIG. 2. FIG. 3-7 illustrate how one of the timers 54 is operated to track a missing data packet or packets. FIGS. 3-7 show five packets (packet 1, packet 2, packet 3, packet 4, and packet 5) being successively sent from the host computer 22 to the host computer 28. In each example, one or more of the five packets is delayed or lost. A line 58 represents a network interface of the host computer 22, and a line 60 represents a network interface of the host computer 28. The lines 58, 60 also represent a timeline with time increasing in the downward direction of FIGS. 3-7.

Figure 3:
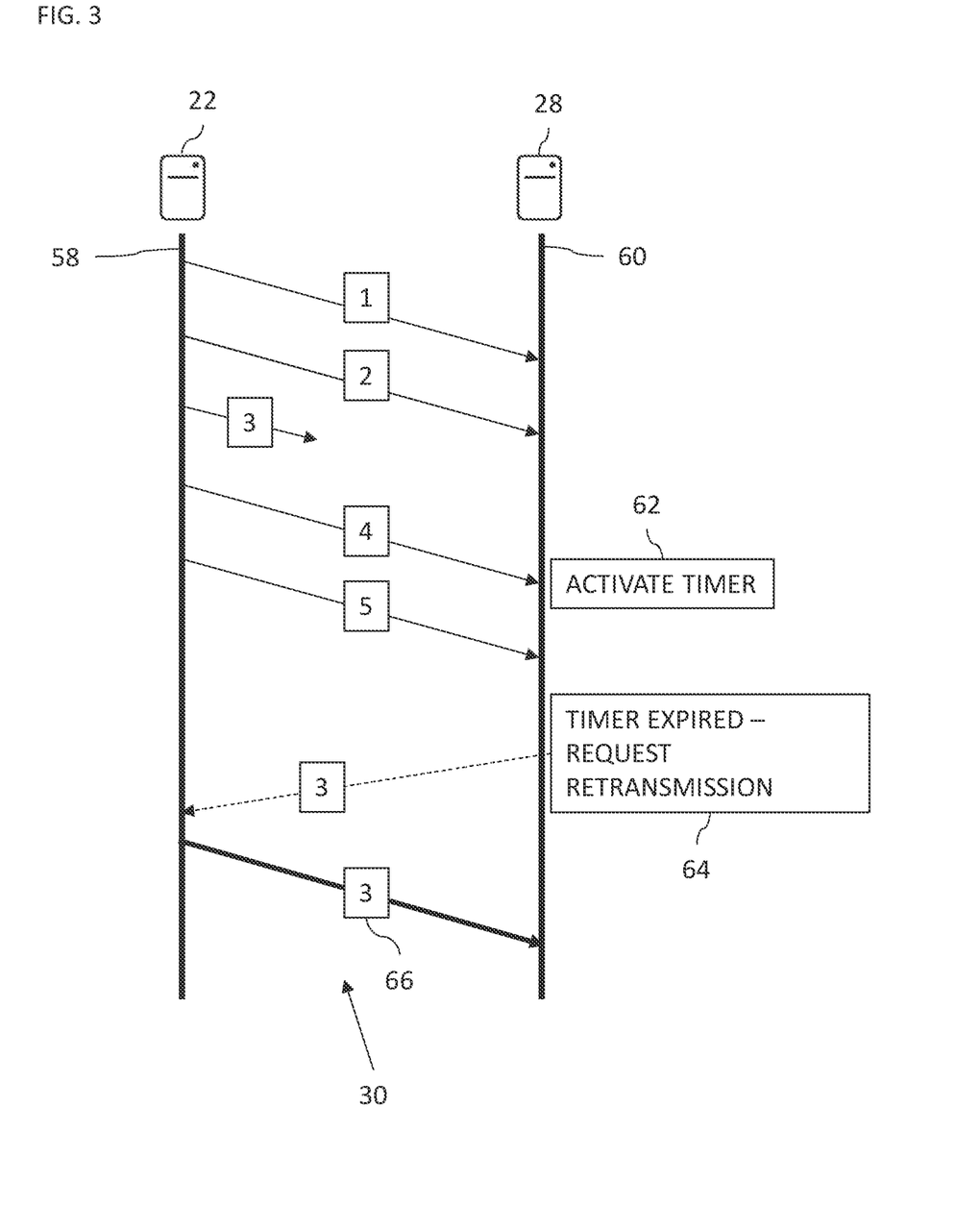
FIGS. 3-7 are schematic views illustrating operation of a missing packet(s) timer for use in the host computer of FIG. 2.

FIG. 3 shows that packets 1 and 2 have been sent by host computer 22 and received by host computer 28 in order. Packet 3 was sent by host computer 22 but not yet received. In fact, in this example, packet 3 is lost (e.g., dropped) in the network 30. Packet 4 is received by the host computer 28. As packet 3 has not been received prior to receiving packet 4, the packet processing circuitry 52 (FIG. 2) activates (block 62) one of the timers 54. Packet 5 is also sent by host computer 22 and received by host computer 28. The time period over which the timer 54 is activated expires without receiving packet 3. Therefore, the packet processing circuitry 52 requests retransmission (block 64) of packet 3, which is then retransmitted (block 66) by host computer 22 and received by host computer 28.

Figure 4:
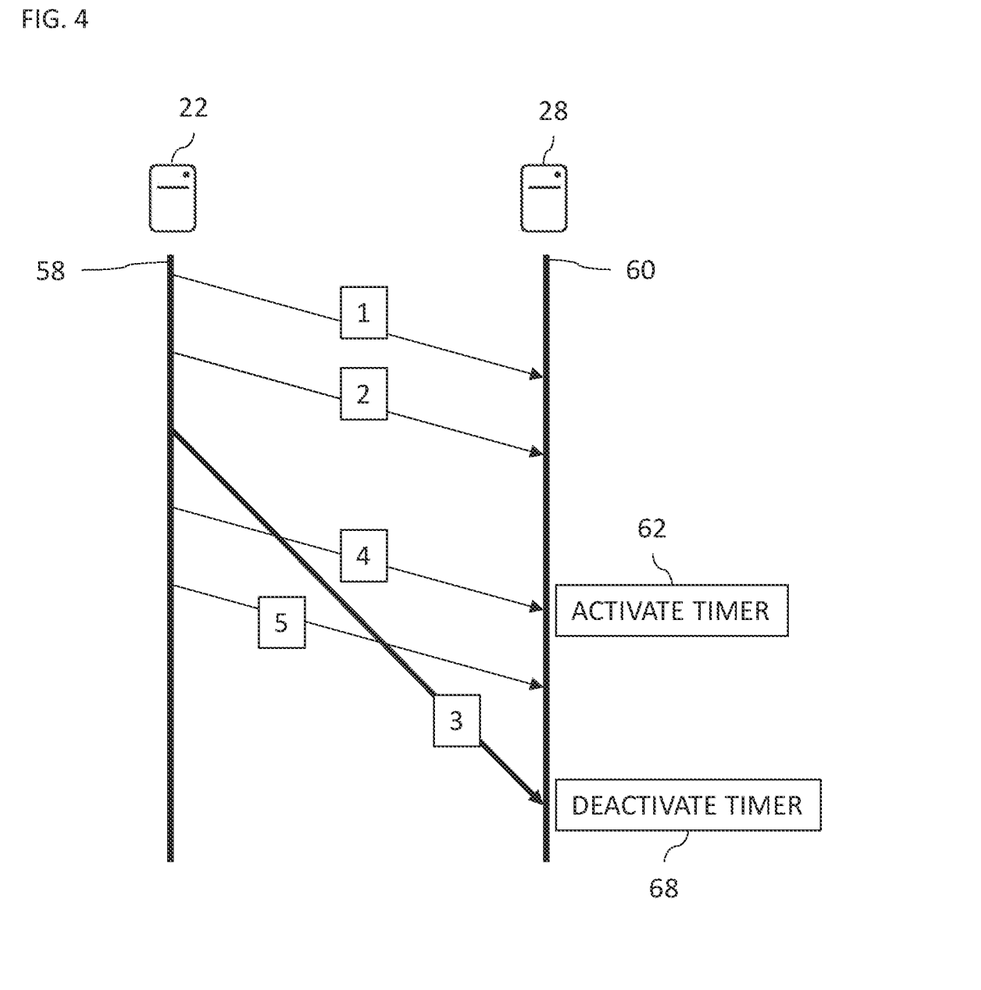

FIG. 4 shows that packets 1 and 2 were sent by host computer 22 and received by host computer 28 in order. Packet 3 was sent by host computer 22 but not yet received. Packet 4 is received by the host computer 28. As packet 3 has not been received prior to receiving packet 4, the packet processing circuitry 52 (FIG. 2) activates (block 62) one of the timers 54. Packet 5 is also sent by host computer 22 and received by host computer 28. Packet 3 is received by host computer 28 prior to expiration of the time period over which timer 54 was activated. Therefore, the packet processing circuitry 52 deactivates (block 68) timer 54.

Figure 5:
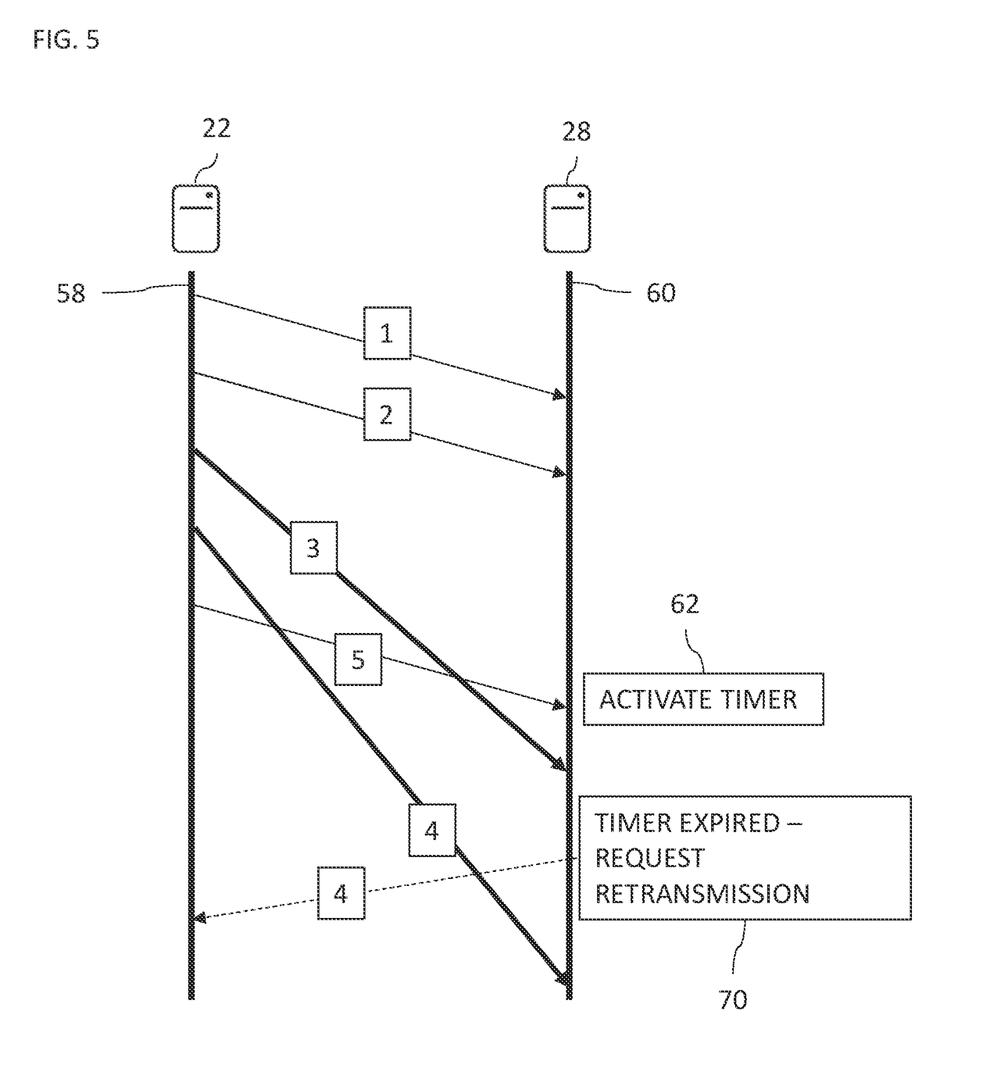

FIG. 5 shows that packets 1 and 2 were sent by host computer 22 and received by host computer 28 in order. Packets 3 and 4 were sent by host computer 22 but not yet received. Packet 5 is received by the host computer 28. As packets 3 and 4 have not been received prior to receiving packet 5, the packet processing circuitry 52 (FIG. 2) activates (block 62) one of the timers 54. Packet 3 is then received by host computer 28 prior to expiration of the time period for which the timer 54 was activated. However, as packet 4 has not yet been received the timer 54 remains activated. In the example of FIG. 5, that timer 54 expired prior to receiving packet 4. Therefore, the packet processing circuitry 52 requests retransmission (block 70) of packet 4. In the meantime, the original packet 4 is received by host computer 28. Some time later, the retransmitted packet 4 (not shown) is also received by host computer 28 resulting in duplicate packet receipt.

Figure 6:
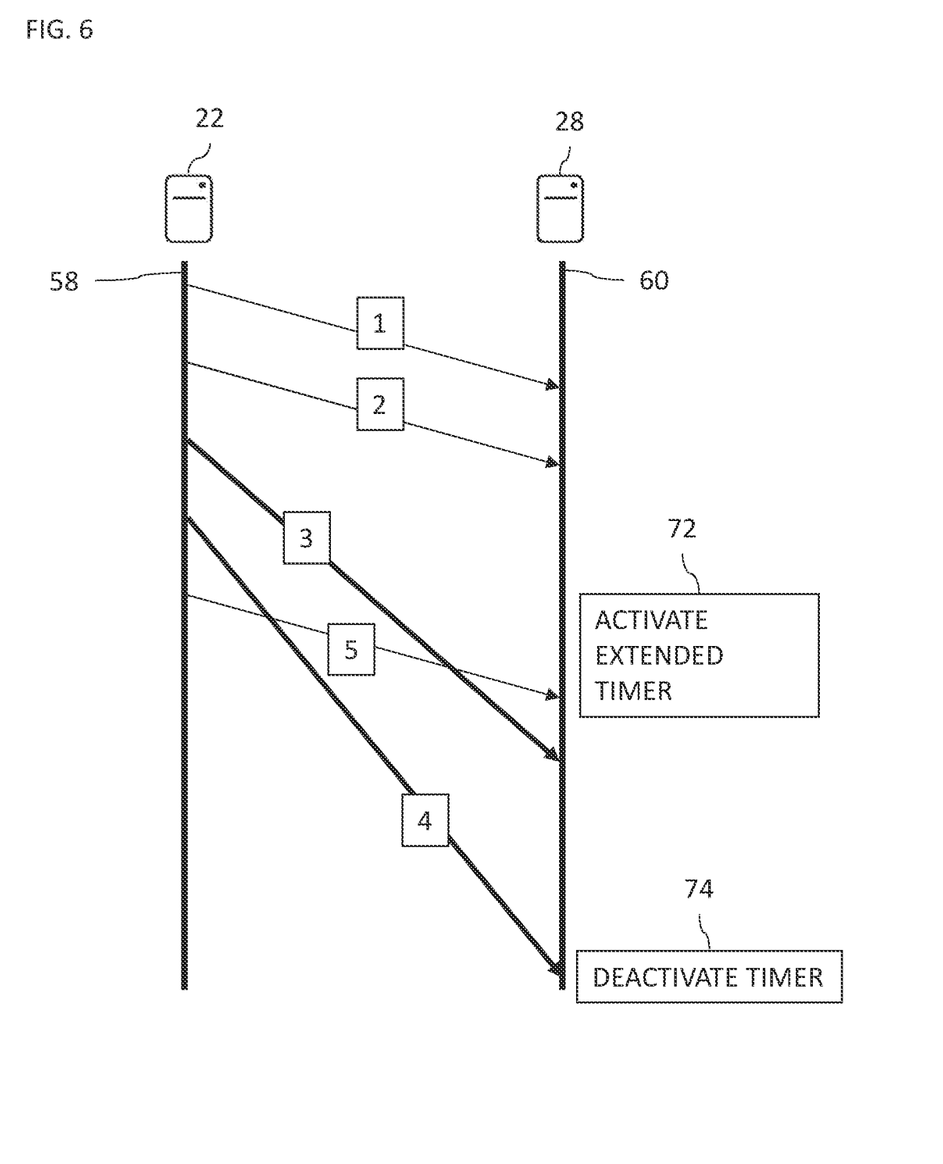

FIG. 6 shows that packets 1 and 2 were sent by host computer 22 and received by host computer 28 in order. Packets 3 and 4 were sent by host computer 22 but not yet received. Packet 5 is received by the host computer 28. As packets 3 and 4 have not been received prior to receiving packet 5, the packet processing circuitry 52 (FIG. 2) activates (block 72) one of the timers 54. As more than one missing packet has been identified, the packet processing circuitry 52 sets the time period for which the timer 54 is activated to an extended (e.g., longer than default) time period, which takes into account that the second packet (i.e., packet 4) is likely to take more time to arrive than the standard time period for a single missing packet. Packets 3 and 4 are received by host computer 28 prior to expiration of the extended time period for which timer 54 was activated. Therefore, the packet processing circuitry 52 deactivates (block 74) timer 54.

Figure 7:
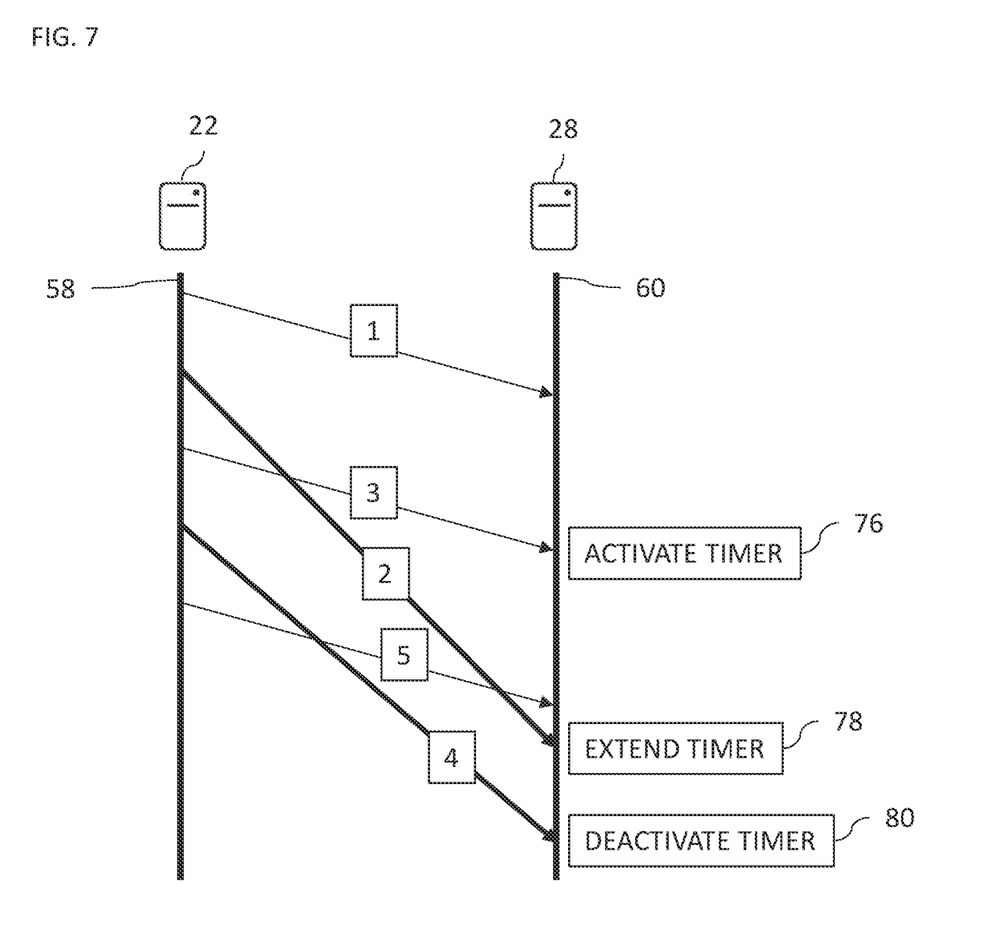

FIG. 7 is an example of non-consecutive missing packets. FIG. 7 shows that packet 1 was sent by host computer 22 and received by host computer 28. Packet 2 was sent by host computer 22 but not yet received by host computer 28 prior to packet 3 being received. As packet 2 has not been received prior to receiving packet 3, the packet processing circuitry 52 (FIG. 2) activates (block 76) one of the timers 54. Packet 4 is sent by host computer 22 but is not yet received by host computer 28 prior to packet 5 being received. When packet 2 is received, and packet 4 has not been received, the packet processing circuitry 52 (FIG. 2) extends (block 78) the time period over which that timer 54 is activated, thereby taking into account that packet 4 is likely to take more time to arrive than the standard time period set for missing packet 2. Packet 4 is received by host computer 28 prior to expiration of the extended time period. Therefore, the packet processing circuitry 52 deactivates (block 80) timer 54.

Figure 8:
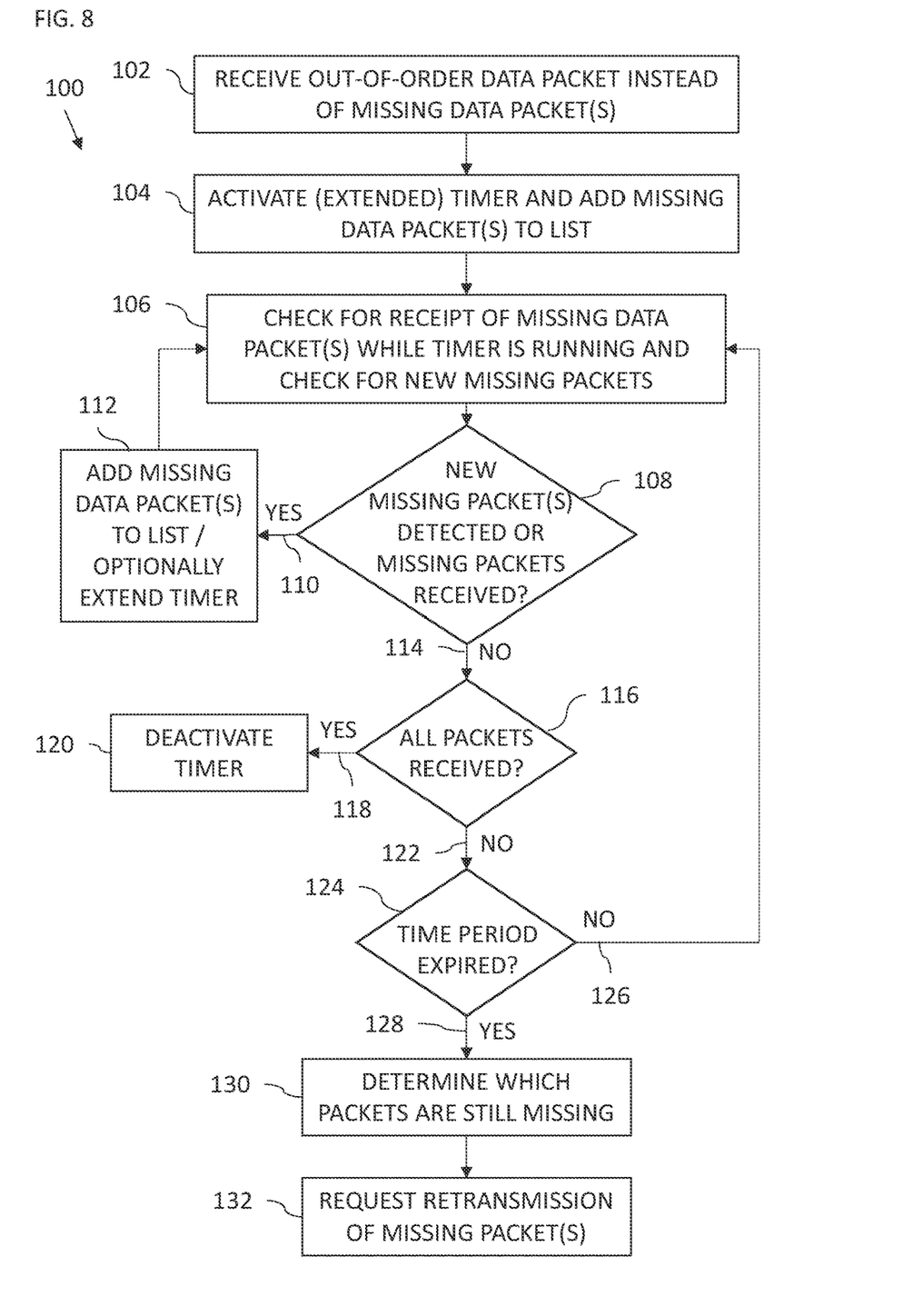
FIG. 8 is a flow chart including steps in a method of the missing packet timer for use in the host computer of FIG. 2.

Reference is now made to FIG. 8, which is a flow chart 100 including steps in a method of the missing packet timer 54 for use in the host computer 28 of FIG. 2. The network interface 48 (FIG. 2) is configured to receive over the network 30 (FIG. 2) from a sending node (e.g., the host computer 22) a sequence of data packets of a network flow having a defined packet order. The network interface 48 is configured to receive (block 102) at least one out-of-order data packet of the data packets instead of an expected, but missing, one of the data packets (or expected, but multiple missing, ones of the data packets) according to the defined packet order. The packet order may be defined using serial numbers (e.g., packet serial numbers) included in headers of the data packets.

The packet processing circuitry 52 (FIG. 2) is configured to activate (block 104) one of the timers 54 responsively to receiving the out-of-order data packet(s) instead of the (multiple) missing data packet(s). In some embodiments, the packet processing circuitry 52 is configured to set the time period over which the timer 54 is activated responsively to a quantity of the multiple missing data packets. For example, when the multiple missing data packets include consecutive data packets in the sequence, the time period may be set as an extended time period (compared to the time period used for a single missing packet) on detecting that the multiple missing data packets are missing (i.e., on receipt of the out-of-order data packet). The packet processing circuitry 52 is configured to add data (e.g., packet serial numbers) about the missing packet or packets to a list of missing packets for the network flow. The packet processing circuitry 52 may also add data about received packets to a list of received packets. The packet processing circuitry 52 is generally configured to remove data about now received, previously missing, data packets from the list of missing packets and add data to the list of received packets for the received data packets.

The packet processing circuitry 52 is configured to check (block 106) for receipt of the (multiple) missing data packet(s) while the timer 54 is activated and to check for new missing data packets responsively to receiving one or more additional out-of-order data packets. In some cases, there may be more than one newly detected missing data packet, which include consecutive data packets in the sequence.

At a decision block 108, the packet processing circuitry 52 determines if new missing packets have been detected or if a known missing packet has now been received. If a new missing packet or packets have been detected or a known missing packet has now been received (branch 110), the packet processing circuitry 52 is configured to add (block 112) data about the new missing packet(s) to the list (if a new missing packet or packets are detected), and update the list (if a known missing packet is received) and optionally extend the timer 54 (if a known missing packet is received and one or more missing packets are still missing) and continue processing with the step of block 106. Therefore, packet processing circuitry 52 is configured to extend the time period over which the timer 54 is activated responsively to receipt of a missing packet (while one or more missing packets are still missing) For example, if packets 1, 3 and 5 have been received but packets 2 and 4 are delayed, the timer 54 is activated when packet 3 arrives, and extended (e.g., after packet 2 is received) to a time value equal to the difference between the arrival times of packets 3 and 5. Another option is to reset (i.e., reactivate) the timer after packet 2 arrives (e.g., starting the time period anew). Therefore, the missing data packets may include non-consecutive data packets in the sequence (e.g., the first detected missing data packet(s) and the newly detected data packets).

If a new missing packet or packets have not been detected or a known missing packet has not now been received (branch 114) at the decision block 108, processing continues with a decision block 116 in which the packet processing circuitry 52 determines if all missing data packets have been received by the host computer 28, for example, by checking the list of missing data packets. If all of the missing data packets have been received (branch 118) by the host computer 28, the packet processing circuitry 52 is configured to deactivate (block 120) the timer 54.

If all the data packets have not been received by the host computer 28 (branch 122), processing continues with a decision block 124 in which the packet processing circuitry 52 determines if the time period over which the timer 54 was activated has expired. If the time period has not expired (branch 126), processing continues with the step of block 106. If the time period has expired (branch 128), the packet processing circuitry 52 is configured to determine (block 130) which data packets are still missing (e.g., by checking the list of missing packets) and request retransmission (block 132) by the sending node (e.g., host computer 22) of the data packets which are still missing (or of the data packet which is missing). Therefore, the packet processing circuitry 52 is configured, upon expiration of the time period over which the timer 52 is activated without having received (all of) the missing data packet(s), to perform a given action such as request retransmission of the missing data packet(s) not yet received from the sending node and/or announce that the missing data packet(s) has been dropped, or not perform any action. For example, if packets 3 and 4 were missing, but now packet 3 has been received, retransmission of packet 4 is requested. Therefore, the packet processing circuitry 52 is configured to not request retransmission of (any of) the (multiple) missing data packet(s) prior to the expiration of the time period.

The network interface 48 is configured to receive over the network 30 from another sending node (e.g., host computer 24) another sequence of data packets of a second network flow having a defined packet order. The packet processing circuitry 52 is configured to activate another timer 54 responsively to receiving an out-of-order data packet instead of an expected, but missing data packet of the second network flow. In this way, two or more timers 54 may be running simultaneously to track missing packets of respective network flows.

Figure 9:
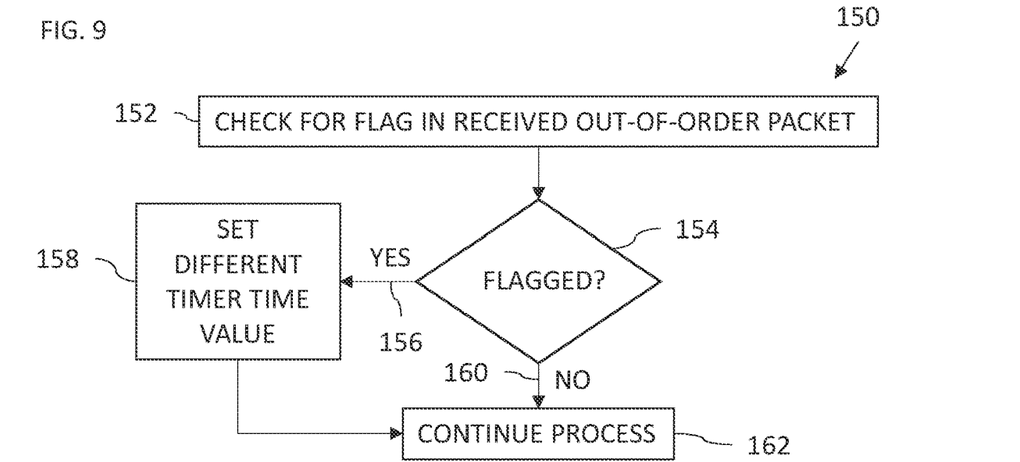
FIG. 9 is a flow chart including steps in a method of setting a timer time value for use in the host computer of FIG. 2.

Reference is now made to FIG. 9, which is a flow chart 150 including steps in a method of setting a timer time value for use in the host computer 28 of FIG. 2. As mentioned previously, missing packets are likely missing due to being sent on a different route over the network 30 than the received out-of-order packet(s). For example, a switch (or router) may determine that an existing route over the network 30 is slow and therefore subsequent packets should be sent along a new route over the network 30. In such a case, the first packet sent along the new route may arrive at the recipient host computer prior to a packet or packets previously sent along the existing (i.e., old) route. Therefore, in some embodiments, a switch in the network 30 is configured to flag the first data packet sent along the new route so that when that data packet arrives in the host computer ahead of a missing packet, the host computer knows that in all likelihood the missing packet is late due to a delay in the existing (i.e., old) route.

Therefore, the host computer 28 may receive an out-of-order data packet, which is flagged as being rerouted by a switch in the network 30. Therefore, in some embodiments, after the step of blocks 102 and 106 of FIG. 8, the packet processing circuitry 52 is configured to check (block 152) for a flag in a received out-of-order data packet. At a decision block 154, if the out-of-order packet is not flagged (branch 160), processing continues (block 162) from where it left off in the flowchart 100 of FIG. 8. If the out-of-order packet is flagged as being rerouted (branch 156), the packet processing circuitry 52 is configured to set (block 158) the time period over which the timer 54 is activated to a time value which is different (e.g., longer) than if the out-of-order packet was not flagged as being rerouted. Processing then continues (block 162) from where it left off in the flowchart 100 of FIG. 8.

Figure 10:
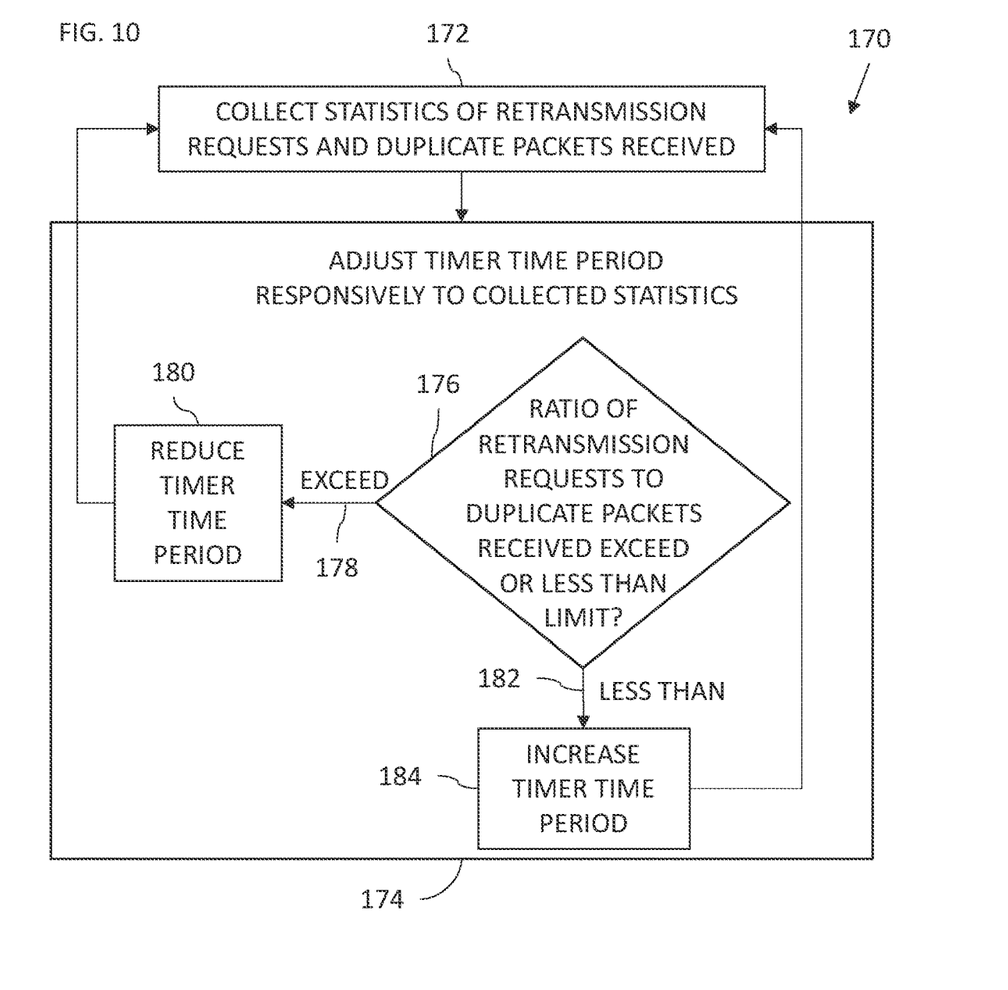
FIG. 10 is a flow chart including steps in a method adjusting the timer time value for use in the host computer of FIG. 2.

Reference is now made to FIG. 10, which is a flow chart 170 including steps in a method to adjusting the timer time value for use in the host computer 28 of FIG. 2. The controller 56 (FIG. 2) is configured to collect (block 172) statistics including: the quantity of packet retransmission requests made by the packet processing circuitry 52; and the quantity of duplicate packets received by the packet processing circuitry 52. The controller 56 is configured to adjust (block 174) the time period over which the timer 54 is activated responsively to the quantity of packet retransmission requests and the quantity of duplicate packets received. The step of block 174 is now described in more detail.

At a decision block 176, if the ratio of the quantity of packet retransmission requests to the quantity of duplicate packets received exceeds a given limit (branch 178), the controller 56 is configured to reduce (block 180) the time period over which the timer 54 is activated, whereas if the ratio of the quantity of packet retransmission requests to the quantity of duplicate packets received is less than a given limit (branch 182), the controller 56 is configured to increase (block 184) the time period over which the timer 54 is activated. After the steps of blocks 180 and 184 processing may be repeated from the step of block 172 so that the timer time period is adjusted iteratively until the ratio is within a given tolerance of the given limit. Any suitable value for the ratio may be selected according to the system bandwidth, system processing capabilities, and system and application tolerances, for example, 1%, 0.5% and, 0.1%.

In practice, some or all of the functions of the controller 56 may be combined in a single physical component or, alternatively, implemented using multiple physical components. These physical components may comprise hard-wired or programmable devices, or a combination of the two. In some embodiments, at least some of the functions of the controller 56 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A communication apparatus, comprising:
   a network interface configured to receive over a network a sequence of data packets of a network flow having a defined packet order, wherein the network interface is configured to receive an out-of-order data packet;
   a timer; and
   packet processing circuitry configured to:
      detect that multiple missing data packets are missing in response to receipt of the out-of-order data packet;
      activate the timer responsively to receiving the out-of-order data packet; and
      set a time period over which the timer is activated responsively to a quantity of the multiple missing data packets so that the time period over which the timer is activated for the multiple missing data packets is greater than the time period over which the timer is activated for a single missing packet.

2. The apparatus according to claim 1, wherein the packet processing circuitry is configured: to check for receipt of the missing data packets while the timer is activated; and upon expiration of the time period over which the timer is activated without having received the missing data packets, to perform a given operation.

3. The apparatus according to claim 2, wherein the packet processing circuitry is configured upon expiration of the time period over which the timer is activated without having received at least one of the missing data packets to request retransmission of the at least one missing data packet not yet received from a sending node.

4. The apparatus according to claim 3, wherein the packet processing circuitry is configured to not request retransmission of the at least one missing data packet prior to the expiration of the time period.

5. The apparatus according to claim 1, wherein the packet processing circuitry is configured to deactivate the timer responsively to receiving all of the missing data packets.

6. The apparatus according to claim 1, wherein the packet processing circuitry is configured to not request retransmission of any of the multiple missing data packets prior to the expiration of the time period.

7. A communication method, comprising:
   receiving over a network a sequence of data packets of a network flow having a defined packet order;
   receiving an out-of-order data packet;
   detecting that multiple missing data packets are missing in response to receipt of the out-of-order data packet;
   activating a timer responsively to receiving the out-of-order data packet; and
   setting a time period over which the timer is activated responsively to a quantity of the multiple missing data packets so that the time period over which the timer is activated for the multiple missing data packets is greater than the time period over which the timer is activated for a single missing packet.

8. The method according to claim 7, further comprising:
   checking for receipt of the missing data packets while the timer is activated; and
   upon expiration of the time period over which the timer is activated without having received the missing data packets, performing a given operation.

9. The method according to claim 8, further comprising, upon expiration of the time period over which the timer is activated without having received at least one of the missing data packets, requesting retransmission of the at least one missing data packet not yet received from a sending node.

10. The method according to claim 9, further comprising not requesting retransmission of the at least one missing data packet prior to the expiration of the time period.

11. The method according to claim 7, further comprising deactivating the timer responsively to receiving all of the missing data packets.

12. The method according to claim 7, further comprising not requesting retransmission of any of the multiple missing data packets prior to the expiration of the time period.

13. A communication apparatus, comprising:
    a network interface configured to receive over a network a sequence of data packets of a network flow having a defined packet order, wherein the network interface is configured to receive an out-of-order data packet;
    a timer; and
    packet processing circuitry configured to:
       detect that multiple missing data packets are missing in response to receipt of the out-of-order data packet;
       activate the timer responsively to receiving the out-of-order data packet; and
       set a time period over which the timer is activated such that the time period increases in accordance with an increasing number of the detected multiple missing data packets.

* * * * *